(12) United States Patent
Gardner

(10) Patent No.: US 6,719,106 B1
(45) Date of Patent: Apr. 13, 2004

(54) DUPLEX SKEWED-ROLLER BRAKE DISC

(75) Inventor: Mark J. Gardner, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/321,960

(22) Filed: Dec. 17, 2002

(51) Int. Cl.[7] .................................................. B60T 7/12
(52) U.S. Cl. ..................... 188/134; 188/71.5; 192/70.14
(58) Field of Search ............................ 188/71.5, 71.1, 188/71.2, 134, 72.1, 72.2, 72.3, 72.7, 72.8, 196, 135; 192/45, 70.14

(56) References Cited

U.S. PATENT DOCUMENTS

| | | | | |
|---|---|---|---|---|
| 4,105,098 A | * | 8/1978 | Klimaitis ..................... | 188/378 |
| 4,169,523 A | * | 10/1979 | Malinowski et al. ....... | 188/71.4 |
| 4,325,466 A | * | 4/1982 | Klaue .......................... | 188/71.4 |
| 4,850,458 A | * | 7/1989 | Allan et al. .................. | 188/134 |
| 5,234,389 A | * | 8/1993 | Goates ........................ | 475/297 |
| 5,307,905 A | * | 5/1994 | Hall et al. ................... | 188/72.6 |
| 5,551,917 A | * | 9/1996 | Wood .......................... | 464/46 |
| 5,655,636 A | * | 8/1997 | Lang et al. .................. | 192/223 |
| 5,944,148 A | * | 8/1999 | Bae et al. .................... | 188/134 |
| 6,043,578 A | * | 3/2000 | Lamb ........................... | 310/92 |
| 6,089,363 A | * | 7/2000 | Mimura ....................... | 192/45 |
| 6,109,415 A | * | 8/2000 | Morgan et al. ........... | 192/223.1 |

* cited by examiner

Primary Examiner—Jack Lavinder
Assistant Examiner—Devon Kramer
(74) Attorney, Agent, or Firm—Ann K. Galbraith

(57) ABSTRACT

A skewed-roller brake assembly 10 is provided, including a first rotor disc 12 and a second rotor disc 12. A stator disc 14, positioned between the first and second rotor discs 12, includes a plurality of skewed-roller slots 16 formed through the stator disc 14. A pair of roller elements 20 are positioned within each of the plurality of skewed-roller slots 16 such that a first of the pair of roller elements 21 protrudes from the stator disc 14 in the direction of the first rotor disc 22 and a second of said pair of roller elements 23 protrudes from the stator disc 14 in the direction of the second rotor disc 24. When the first and second rotor discs 12 are moved towards the stator disc 14, the first of the pair of roller elements 21 and the second of the pair of roller elements 23 rotate in concert while transmitting frictional torque to the first rotor disc 12 and the second rotor disc 12 respectively.

20 Claims, 3 Drawing Sheets

DUPLEX SKEWED-ROLLER BRAKE DISC

TECHNICAL FIELD

The present invention relates generally to a skewed-roller brake assembly and more specifically to a skewed-roller brake assembly with reduced package volume for use in applications with constrained packaging requirements.

BACKGROUND OF THE INVENTION

Aircraft commonly utilize mechanical and control features that are critical to proper operation. Although it is preferable for all mechanical operations on an aircraft to function as designed without flaw, it is equally preferable to design such systems to adequately function upon failure of a single component. Such is the case when motors are utilized to move a load during operation. If a motor system becomes accidentally disconnected from a drive shaft it is often critical that the drive shaft is prevented from free-rotation to prevent uncontrolled movement of the load.

Such is the case with the drive system for aircraft flaps. Aircraft flaps are commonly driven by one or more mechanical actuators. The actuators, in turn, are commonly driven by a motor system. Failure of the motor system or transfer torque tubes can leave the aircraft flaps subject to acting air loads without adequate system restraint. Since allowing the aircraft flaps to be moved at the mercy of acting air loads is not desirable, it is common practice to incorporate safety brakes into the flap drive system. These safety brakes, or "no-back" brakes, prevent movement of the flaps upon accidental disengagement or failure of their driving motor system.

One known category of no-back brakes utilized for these type of applications is known as skewed-roller no-backs. Skewed roller-brakes utilize roller bearings contained within a cage assembly and positioned between rotor and stator discs. The axis of rotation of the rollers are skewed relative to a radial line from the rotational axis of the rotor and stator such that when compressed between the rotor and stator disc they provide sliding frictional resistance parallel to the rotational movement of the two discs. This allows the skewed-rollers to provide braking to the drive assembly through the application of frictional torque to the rotors.

Although skewed-roller brake assemblies are known in the prior art, they carry with them packaging considerations that limit their application in certain mechanisms. The packaging requirements necessary to fit the roller bearings and cage assemblies into the braking system can make the location of such systems difficult in areas constrained by available envelope.

It would, therefore, be highly desirable to have a skewed-roller brake assembly with improved packaging considerations such that the brake assembly could be incorporated into applications with severely constrained envelopes. It would further be highly desirable to have a braking system that could facilitate reductions in weight and cost of existing skewed-roller braking systems.

SUMMARY OF THE INVENTION

It is therefore an object to the present invention to provide a skewed-roller brake assembly with reduced profile for use in applications with constrained packaging requirements.

In accordance with the objects of the present invention a skewed-roller brake assembly is provided. The skewed-roller brake assembly includes a first rotor disc and a second rotor disc. A stator disc, positioned between the first and second rotor discs, includes a plurality of skewed-roller slots formed through the stator disc. A pair of roller elements are positioned within each of the plurality of skewed-roller slots such that a first of said pair of roller elements protrudes from the stator disc in the direction of the first rotor disc and a second of said pair of roller elements protrudes from the stator disc in the direction of the second rotor disc. When the first and second rotor discs are moved towards the stator disc, the first of said pair of roller elements and the second of said pair of roller elements rotate in concert while transmitting frictional torque to the first rotor disc and the second rotor disc respectively.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
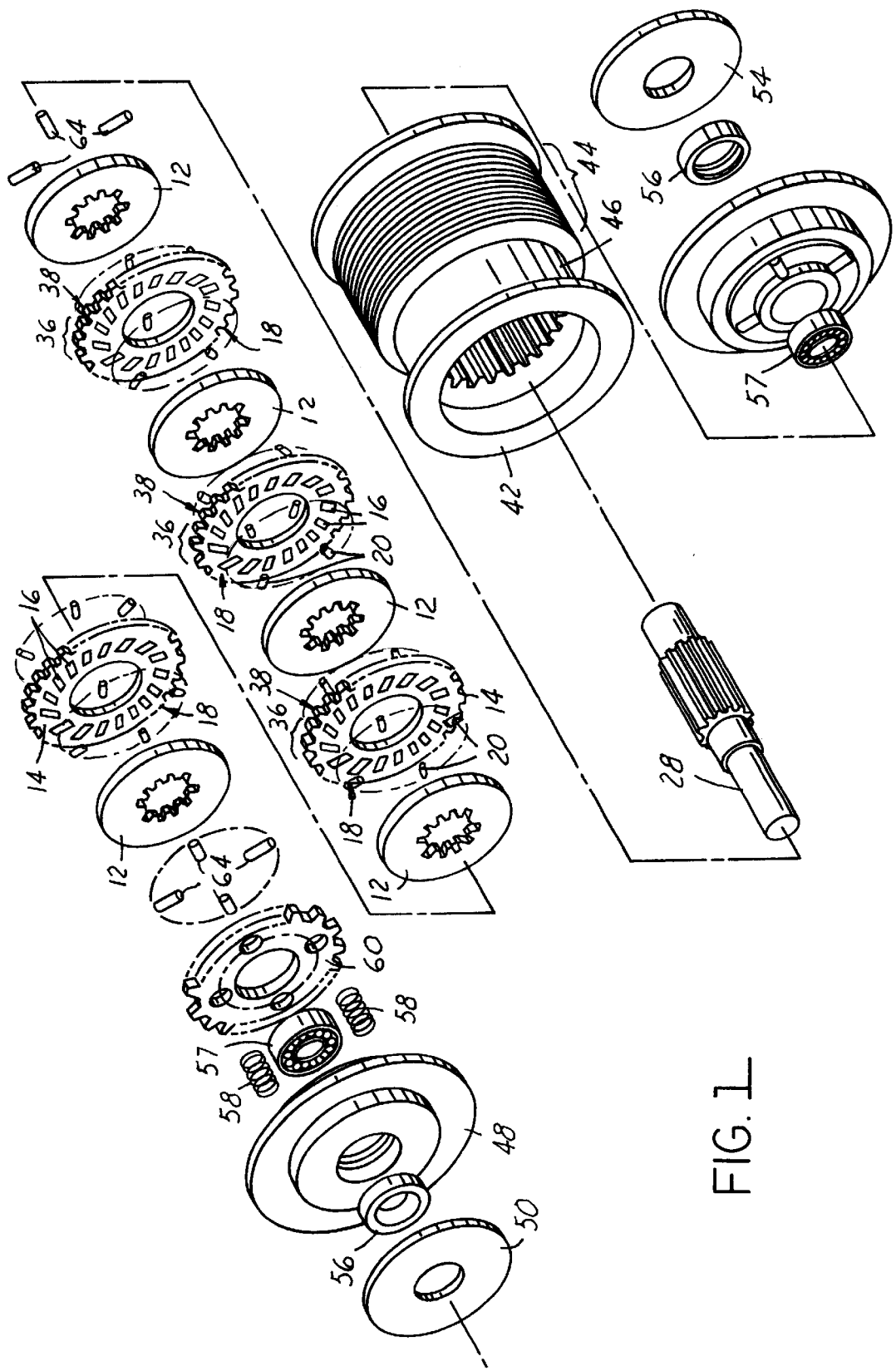
FIG. 1 is an exploded view illustration of a skewed-roller brake assembly in accordance with the present invention.
Figure 2:
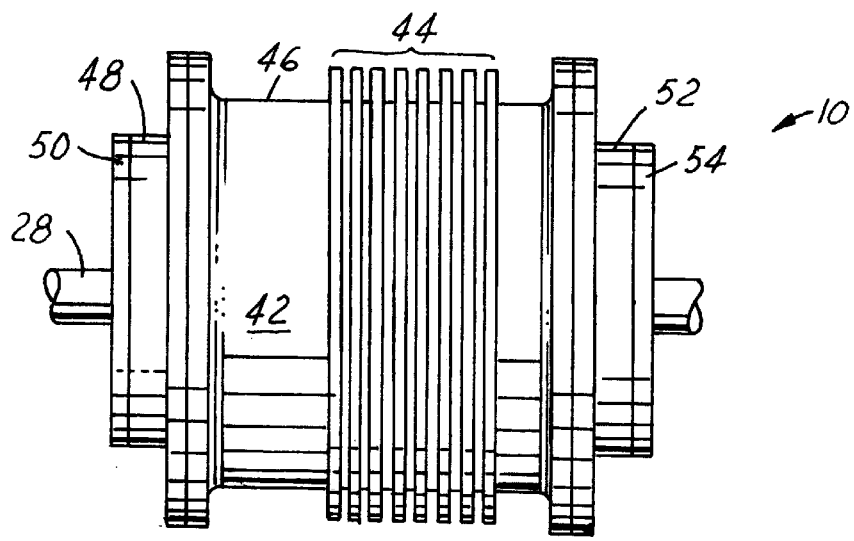
FIG. 2 is a side view illustration of the skewed-roller brake assembly illustrated in FIG. 1.

Referring now to FIG. 1, which is an exploded view illustration of a skewed brake roller assembly 10 in accordance with the present invention. The skewed brake roller assembly 10 is intended for use in an aircraft control surface drive system, specifically flap control. Although the skewed-roller brake assembly 10 has been designed for this particular application, it should be understood that its use is applicable in any application wherein a reduced profile skewed brake assembly is desirable.

The skewed brake roller assembly 10 includes an alternating plurality of rotor discs 12 and stator discs 14. Although the present invention can function with only a single stator disc 14 positioned between two rotor discs 12, it is preferably formed using a plurality of discs for efficiency and efficacy reasons. The skewed-roller slots 16 are formed through the stator disc 14 and are preferably evenly spaced around the stator disc surface 18. The skewed-roller slots 16 are skewed by an angle relative to a radial line from the center of the stator disc 14. Although it is contemplated that the skewed-roller slots 16 may be formed in a variety of fashions, in one embodiment the skewed-roller slots 16 are close-fitting, machined slots.

Figure 4:
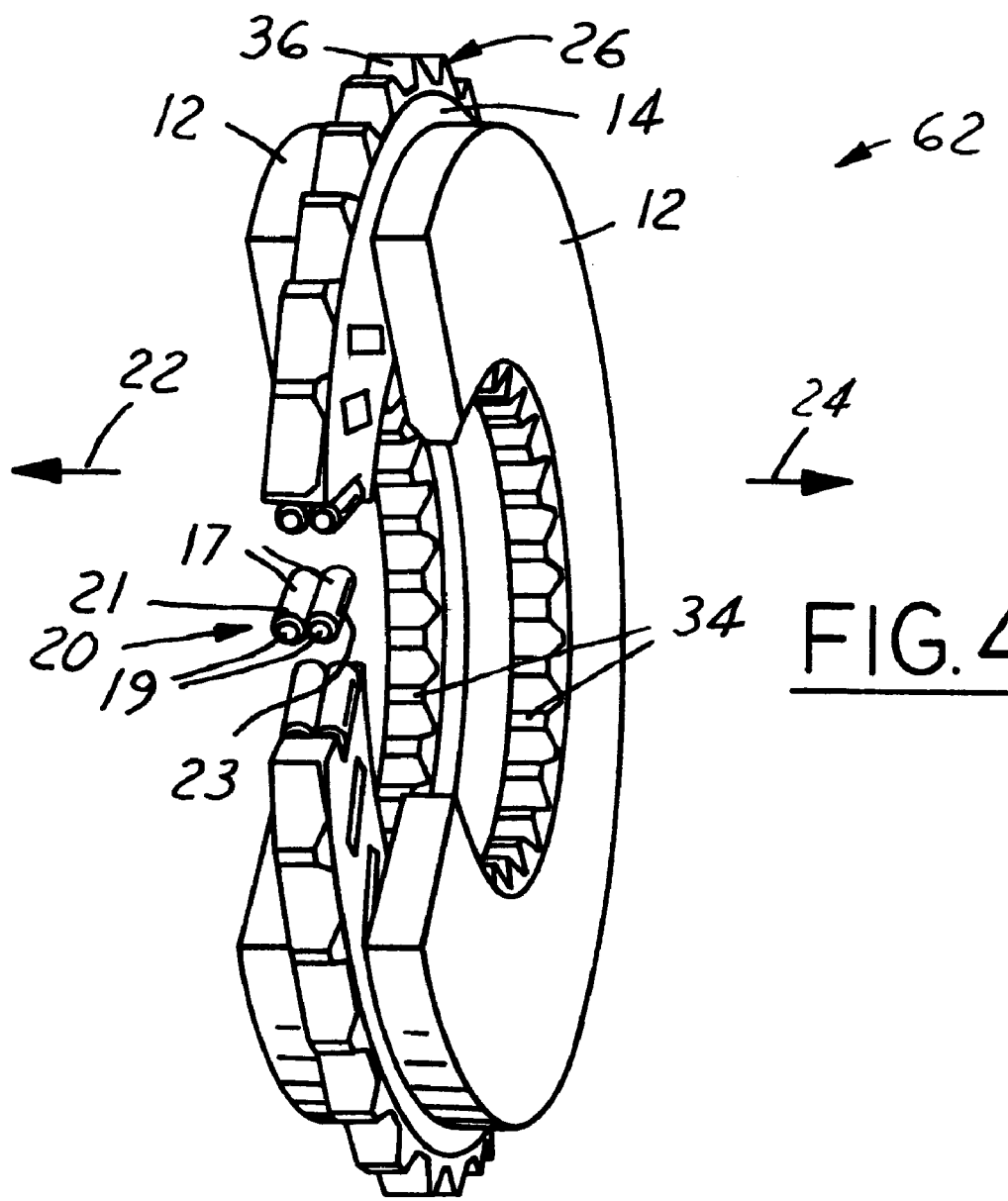
FIG. 4 is a detailed illustration of a pair of rotor discs and a stator disc for use in the skewed-roller brake assembly illustrated in FIG. 3.

The present invention reduces the profile of prior art skewed-roller braking systems by eliminating any separate skewed-roller cage assembly, reducing the diameter of the roller elements 20, and fitting a pair of roller elements 20 into each of the skewed-roller slots 16. The roller elements 20 are preferably cylindrical rollers 17. The cylindrical rollers 17 may include flat or rounded roller ends 19. The pair of roller elements 20 is orientated such that a first of the pair of roller elements 21 protrudes from the stator disc in the direction of the first rotor disc 22 and a second of the pair of roller elements 23 protrudes from the stator disc 14 in the direction of the second rotor disc 24 (see FIG. 4). Each of the pair of roller elements 20 within a skewed-roller slot 16 rotate in concert with each other. The skewed orientation of the skewed-roller slots 16, however, means that if the rotor discs 12 are pressed into the stator disc 14, torque is transmitted from the rotor discs 12 to the roller elements 20 via sliding friction parallel to the axis of the roller elements 20. Proper selection of slot skew angle can assure the pair of roller elements 20 properly roll in concert against one another. The torque is transmitted to the stator disc 14 via the skewed-roller slots 16 and then preferably to ground via a suitable torque transmitting feature at the stator outer diameter 26 (such as a spline or key).

Figure 3:
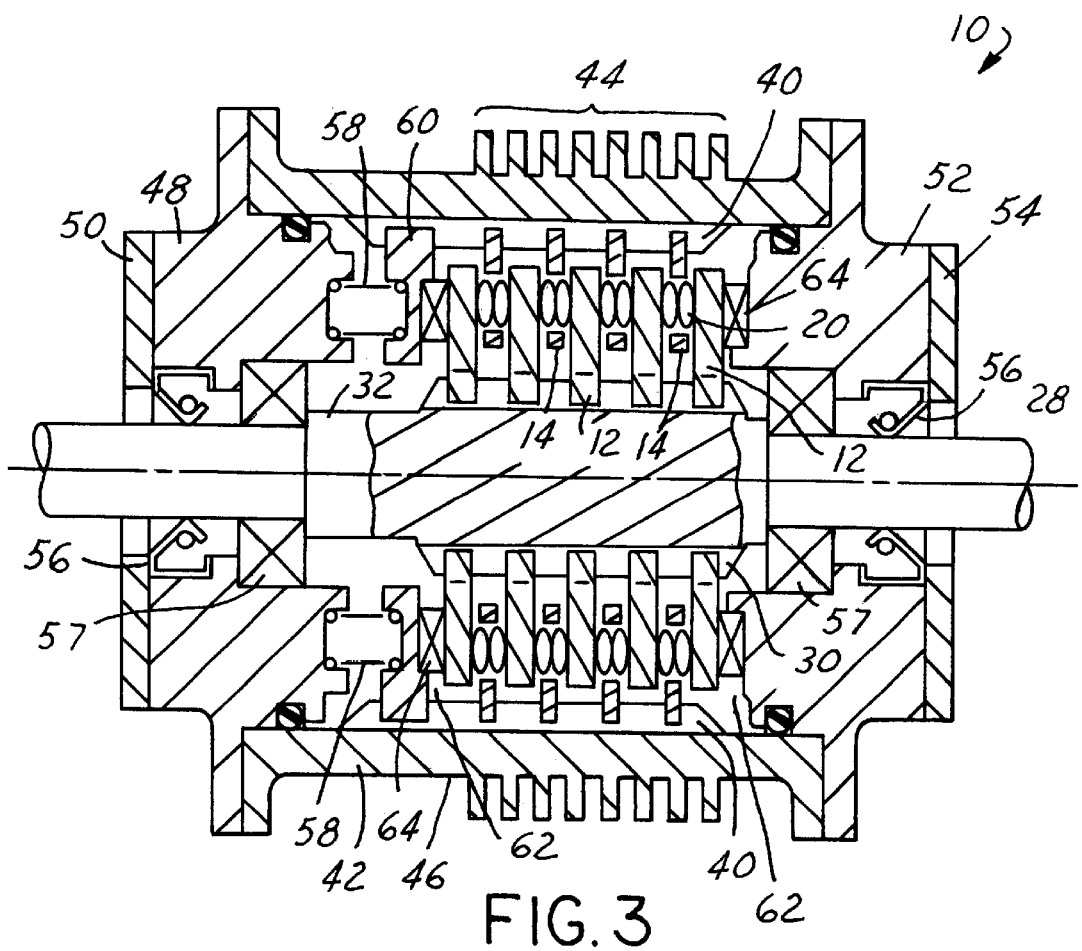
FIG. 3 is a cross-sectional illustration of the skewed-roller brake assembly illustrated in FIG. 2, the cross-section taken along the lines 3—3 in the direction of the arrows.

Although a variety of configurations are contemplated for transmitting torque utilizing the present inventions unique stator disc 14 roller element 20 combination, one particular embodiment is illustrated in FIG. 3. A rotor shaft 28 runs through the center axis of the skewed-roller brake assembly 10 and includes a rotor shaft spline 30 formed on the rotor shaft outer diameter 32. The rotor shaft spline 30 engages an internal rotor spline 34 (see FIG. 4) formed in the center of each rotor disc 12. In this fashion the plurality of rotor discs 12 rotate in concert with the rotor shaft 28. Similarly, each of the plurality of stator discs 14 includes an external stator spline 36 formed on the stator disc outer circumference 38. The external stator spline 36 engages a housing stator spline 40 formed into the housing 42 surrounding the rotor discs 12 and the stator discs 14. This allows the torque generated by the rotor discs 12 to be transferred into the housing 42 upon activation of the skewed-roller brake assembly 10. It should be understood that although the preceding describes the preferred embodiment of the present invention, various modifications could be made without effecting the benefits of the present invention. It is possible, for example, for the rotor discs 12 to be in communication with the housing 42 and the stator discs 14 to be in direct communication with the rotor shaft 28 as opposed to the reverse as described.

Similarly, the present invention can include a variety of improvement elements intended to increase performance of the present invention. The housing 42, for example, can include a plurality of cooling fins 44 formed into the housing outer surface 46. This allows heat generated by the skewed-roller brake assembly 10 to be dissipated into the surrounding environment. This can increase the reliability and durability of the braking assembly 10. Furthermore, a first end housing cover 48 and first end seal cover 50 placed on one end of the cylindrical housing 42 and a second end housing cover 52 and a second end seal cover 54 placed on the opposite end can serve to secure the plurality of rotor discs 12 and stator discs 14 within the brake assembly 10. Lip seal elements 56 can be utilized between the rotor shaft 28 and the end housing covers 48,52 to prevent leakage of lubrication from the brake assembly 10 or contamination from outside sources. Ball bearings 57 positioned between the rotor shaft 28 and the end housing covers 48,52 insure free rotation of the shaft 28 prior to activation of the brake assembly 10.

A plurality of preload springs 58 positioned between one of the end housing covers 48,52 and a pressure plate 60 (illustrated between the first housing cover 48 and the pressure plate 60) places a preloaded pressure on the rotor/stator assembly 62. Needle bearings 64 can be used to reduce frictional contact between the rotor/stator assembly 62 and the pressure plate 60 on one end and the second end housing cover 52 on the other. It is further contemplated that the pressure plate 60 includes a plurality of pressure plate splines 66 formed on the pressure plate outer circumference 68. The plurality of pressure plate splines 66 engage the housing stator spline 40. It should be understood, however, that while a detailed configuration of a particular embodiment has been described a wide variety of modifications and alterations would be apparent upon review of this disclosure.

The present design shown uses the spring preload 58 described above to apply a constant clamping force which in turn, creates a constant brake capacity. The brake capacity must be sufficient to hold the required brake load. The drive system in turn, must have sufficient capacity to slip the brake at that capacity. The skewed roller brake disc concept however, does not rely on or require any particular method or design for applying brake clamping force. The invention could for instance be used in brake devices which apply brake clamping force proportional to brake load, such as ball-ramp actuated devices.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A skewed-roller braking assembly comprising:
   a first rotor disc;
   a second rotor disc;
   a stator disc positioned adjacent to and in-between said first rotor disc and said second rotor disc, said stator disc including a plurality of skewed-roller slots formed through said stator disc; and
   a plurality of roller elements, a pair of said plurality of roller elements are positioned within each of said plurality of skewed-roller slots such that a first of said pair of roller elements protrudes from said stator disc in the direction of said first rotor and a second of said pair of roller elements protrudes from said stator disc in the direction of said second rotor disc;
   wherein when said first rotor disc and said second rotor disc are moved towards said stator disc, said first of said pair of roller elements and said second of said pair of roller elements rotate in concert while transmitting frictional torque between said first rotor disc, said second rotor disc and said stator disc.

2. A skewed-roller braking assembly as described in claim 1, wherein said plurality of roller elements comprises:
   a plurality of cylindrical rollers.

3. A skewed-roller braking assembly as described in claim 2, wherein said plurality of cylindrical rollers included rounded ends.

4. A skewed-roller braking assembly as described in claim 1, further comprising:
   a single rotor shaft passing through a rotational center of said first rotor disc, said second rotor disc, and said stator disc.

5. A skewed-roller braking assembly as described in claim 4, wherein said single rotor shaft engages said first rotor disc and said second rotor disc by way of a rotor shaft spline formed on a rotor shaft outer diameter, said rotor shaft spline engaging a first internal rotor shaft spline formed in the center of said first rotor disc and engaging a second internal rotor shaft spline formed in the center of said second rotor disc.

6. A skewed-roller braking assembly as described in claim 1, further comprising:

a cylindrical housing surrounding said first rotor disc, said second rotor disc, and said stator disc.

7. A skewed-roller braking assembly as described in claim 6, wherein said cylindrical housing includes a housing stator spline formed into said cylindrical housing, said housing stator spline engaging an external stator spline formed on a stator disc outer circumference of said stator disc.

8. A skewed-roller braking assembly as described in claim 6, further comprising:
   a plurality of cooling fins formed into a housing outer surface of said cylindrical housing.

9. A skewed-roller braking assembly as described in claim 6, further comprising:
   a first end housing cover;
   a second end housing cover;
   a pressure plate positioned between said first end housing cover and said second end housing cover;
   at least one preload spring positioned between and in communication with said first end housing cover and said pressure late;
   a first bearing assembly positioned between and in communication with said pressure plate and said first rotor disc; and
   a second bearing assembly positioned between said second rotor disc and said second end housing cover.

10. A skewed-roller braking assembly as described in claim 1, further comprising:
    a plurality of alternating additional stator discs and additional rotor discs positioned adjacent said second rotor disc.

11. A skewed-roller braking assembly comprising:
    a first rotor disc;
    a second rotor disc;
    a rotor shaft rotationally engaged to said first rotor disc and said second rotor disc;
    a stator disc positioned adjacent to and in-between said first rotor disc and said second rotor disc, said stator disc including a plurality of skewed roller slots formed through said stator disc;
    a housing surrounding said first rotor disc, said second rotor disc, and said stator disc, said housing rotationally engaging said stator disc; and
    a plurality of roller elements, a pair of said plurality of roller elements are positioned within each of said plurality of skewed-roller slots such that a first of said pair of roller elements protrudes from said stator disc in the direction of said first rotor disc and a second of said pair of roller elements protrudes from said stator disc in the direction of said second rotor disc;
    wherein said first of said pair of roller elements and said second of said pair of roller elements rotate in concert while transmitting frictional torque between said first rotor disc, said second rotor disc and said stator disc.

12. A skewed-roller braking assembly as described in claim 11, wherein said plurality of roller elements comprises:
    a plurality of cylindrical rollers.

13. A skewed-roller braking assembly as described in claim 12, wherein said plurality of cylindrical rollers included rounded ends.

14. A skewed-roller braking assembly as described in claim 11, wherein said rotor shaft engages said first rotor disc and said second rotor disc by way of a rotor shaft spline formed on a rotor shaft outer diameter, said rotor shaft spline engaging a first internal rotor shaft spline formed in the center of said first rotor disc and engaging a second internal rotor shaft spline formed in the center of said second rotor disc.

15. A skewed-roller braking assembly as described in claim 11, wherein said rotor shaft comprises a single rotor shaft.

16. A skewed-roller braking assembly as described in claim 11, wherein said housing comprises a cylindrical housing.

17. A skewed-roller braking assembly as described in claim 11, wherein said housing includes a housing stator spline formed into said housing, said housing stator spline engaging an external stator spline formed on a stator disc outer circumference of said stator disc.

18. A skewed-roller braking assembly as described in claim 6, further comprising:
    a plurality of cooling fins formed into a housing outer surface of said housing.

19. A skewed-roller braking assembly as described in claim 11, further comprising:
    a first end housing cover;
    a second end housing cover;
    a pressure plate positioned between said first end housing cover and said second end housing cover;
    at least one preload spring positioned between and in communication with said first and housing cover and said pressure plate;
    a first bearing assembly positioned between and in communication with said pressure plate and said first rotor disc; and
    a second bearing assembly positioned between said second rotor disc and said second end housing cover.

20. A skewed-roller braking assembly as described in claim 1, further comprising:
    a plurality of alternating additional stator discs and additional rotor discs positioned adjacent said second rotor disc.

* * * * *

UNITED STATES PATENT AND TRADEMARK OFFICE
CERTIFICATE OF CORRECTION

PATENT NO. : 6,719,106 B1
DATED : April 13, 2004
INVENTOR(S) : Mark J. Gardner

It is certified that error appears in the above-identified patent and that said Letters Patent is hereby corrected as shown below:

<u>Column 5,</u>
Line 21, correct the word "late" to -- plate. --
Line 40, correct "skewed roller" to -- skewed-roller. --

Signed and Sealed this

Tenth Day of August, 2004

JON W. DUDAS
*Acting Director of the United States Patent and Trademark Office*